(12) United States Patent
Gao et al.

(10) Patent No.: US 11,988,771 B2
(45) Date of Patent: May 21, 2024

(54) METHOD AND SYSTEM FOR DETECTING CARGO INSIDE A CONTAINER

(71) Applicant: BlackBerry Limited, Waterloo (CA)

(72) Inventors: Yu Gao, Waterloo (CA); Mahendra Fuleshwar Prasad, Waterloo (CA); Alexander Karl Levato, Toronto (CA); Scott Leonard Dill, Paris (CA)

(73) Assignee: BlackBerry Limited, Waterloo (CA)

( * ) Notice: Subject to any disclaimer, the term of this patent is extended or adjusted under 35 U.S.C. 154(b) by 182 days.

(21) Appl. No.: 17/574,601

(22) Filed: Jan. 13, 2022

(65) Prior Publication Data
US 2023/0221409 A1    Jul. 13, 2023

(51) Int. Cl.
*G01S 7/41* (2006.01)
*G06Q 10/0833* (2023.01)
*G06Q 10/087* (2023.01)

(52) U.S. Cl.
CPC .......... *G01S 7/412* (2013.01); *G06Q 10/0833* (2013.01); *G06Q 10/087* (2013.01)

(58) Field of Classification Search
CPC ................................................. G06Q 10/0833
See application file for complete search history.

(56) References Cited

U.S. PATENT DOCUMENTS 4,360,811 A * 11/1982 Cantwell, Jr. ......... G01S 7/2927
342/93

FOREIGN PATENT DOCUMENTS

GB         2270437 A  *  3/1994  ........... G01S 7/2923
WO  WO-2022156905 A1 *  7/2022  ............. G01S 13/34

OTHER PUBLICATIONS

Yim et al., Quantified Activity Measurement for Medical Use in Movement Disorders through IR-UWB Radar Sensor, May 8, 2021, Sensors, 19, p. 4 (Year: 2021).*
Canada Office Action dated Jan. 18, 2024; Canadian Patent Application No. 3, 175,217.

* cited by examiner

*Primary Examiner* — Vladimir Magloire
*Assistant Examiner* — Eric K Hodac
(74) *Attorney, Agent, or Firm* — Rowand LLP

(57) ABSTRACT

Systems and methods for determining a presence of cargo within a container are described. The determination may comprise transmitting a first electromagnetic signal within the container and receiving a first reflected electromagnetic signal corresponding to the first electromagnetic signal. The first reflected electromagnetic signal may be converted into a set of first magnitude values corresponding to a set of bin values representing a respective distance from the radar device. The first magnitude values may be integrated, using a moving window, over successive subranges of bin values to produce a set of integrated magnitude values. A set of integrated base magnitude values may be subtracted from the set of integrated magnitude values to produce a set of normalized integrated magnitude values. A presence of cargo within the container may then be determined by comparing each of the normalized integrated magnitude values with corresponding threshold values.

20 Claims, 17 Drawing Sheets

METHOD AND SYSTEM FOR DETECTING CARGO INSIDE A CONTAINER

FIELD OF THE INVENTION

The present application generally relates to the use of radar, and more particularly, to the use of radar to detect a presence of cargo within a container.

BACKGROUND

In the freight transport industry, it may be desirable to determine the presence, quantity and location of cargo within a transport container. This determination may be made manually, but only at a significant cost of resources. Accurate methods of determining the presence, quantity, or location of cargo within a shipping container are therefore desired.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
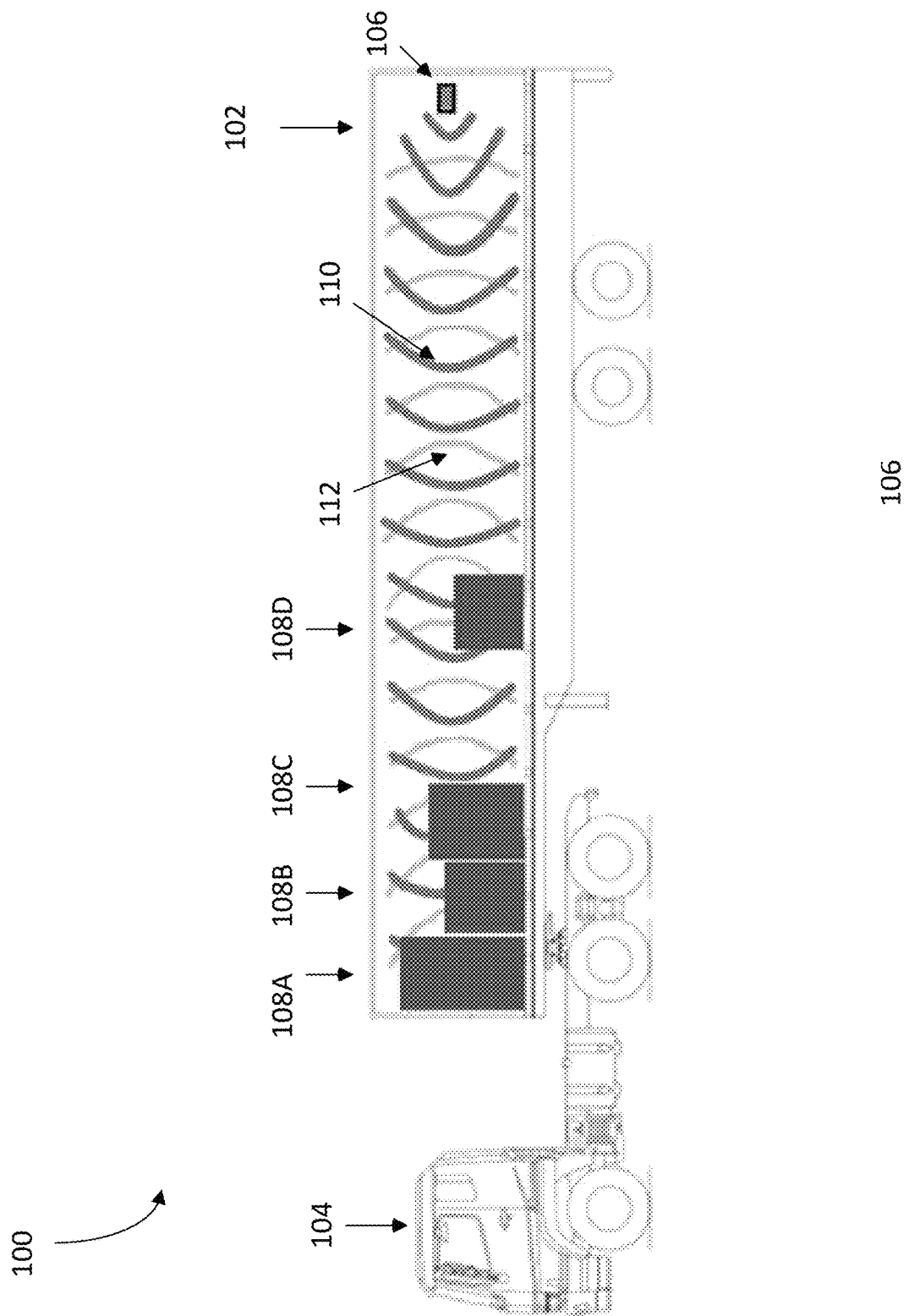
FIG. 1 is a schematic illustration of a semi-truck supporting a shipping container.

In accordance with one aspect of the present application, there may be provided a computing system for determining a presence of cargo within a container, the computer system comprising a communications module; a processor coupled to the communications module; and a memory coupled to the processor, the memory storing processor-executable instructions which, when executed, configure the processor to transmit, by a radar device, a first electromagnetic signal within the container; receive, at the radar device, a first reflected electromagnetic signal corresponding to the first electromagnetic signal; convert the first reflected electromagnetic signal into a set of first magnitude values corresponding to a set of bin values, each bin value representing a respective distance from the radar device; integrate, using a moving window, the first magnitude values over successive subranges of bin values to produce a set of integrated magnitude values; subtract a set of integrated base magnitude values from the set of integrated magnitude values to produce a set of normalized integrated magnitude values; and determine the presence of cargo within the container by comparing each of the normalized integrated magnitude values with corresponding threshold values.

In some implementations, the instructions further cause the processor to detect the presence of cargo within the container by identifying one of the integrated normalized magnitude values exceeding its corresponding threshold value; identifying the subrange of bin values associated with the one of the integrated normalized magnitude values exceeding its corresponding threshold value; and determining a distance of the cargo from the radar device based on one or more of the respective distances represented by the bin values of the subrange of bin values.

In some implementation, determining a distance of the cargo from the radar device is based on a measure of central tendency of the bin values of the subrange of bin values.

In some implementations, the instructions further cause the processor to detect the absence of cargo within the container by determining that none of the integrated normalized magnitude values exceed the corresponding threshold values.

In some implementations, the instructions further cause the processor to, prior to transmitting the first electromagnetic signal, determine the set of integrated base magnitude values when the container is empty and storing the set of integrated base magnitude values in memory.

In some implementations, determining the set of integrated base magnitude values comprises the steps of transmitting, by a radar device, an initial electromagnetic signal within the container when empty; receiving, at the radar device, an initial reflected electromagnetic signal corresponding to the initial electromagnetic signal; converting the initial reflected electromagnetic signal into a set of base magnitude values corresponding to the set of bin values; and integrating, using a moving window, the base magnitude values over the successive subranges of bin values to determine the set of integrated base magnitude values.

In some implementations, determining the set of integrated base magnitude values comprises obtaining sets of reflected electromagnetic signals within the container when empty; converting the sets of electromagnetic signals into sets of base magnitude values corresponding to the set of bin values; integrating using a moving window each set of base magnitude values over the successive subranges of bin values to produce sets of provisional integrated base magnitude values; and averaging the sets of provisional integrated base magnitude values to obtain the set of integrated base magnitude values.

In some implementations, each subrange includes an equal number of bin values, and there is overlap between the bin values associated with a particular subrange and the bin values associated with an adjacent subrange.

In some implementations, the overlap is equal to the number of bin values in each subrange minus one.

In some implementations, each of the integrated magnitude values corresponds to a bin value; each bin value is associated with one of the successive subranges of bin values; and each of the integrated magnitude values represents a sum of the subrange of bin values associated with the corresponding bin value.

In accordance with another aspect of the present application, there is provided a method for determining a presence of cargo within a container. The method may comprise transmitting, by a radar device, a first electromagnetic signal within the container; receiving, at the radar device, a first reflected electromagnetic signal corresponding to the first electromagnetic signal; converting the first reflected electromagnetic signal into a set of first magnitude values corresponding to a set of bin values, each bin value representing a respective distance from the radar device; integrating, using a moving window, the first magnitude values over successive subranges of bin values to produce a set of integrated magnitude values; subtracting a set of integrated base magnitude values from the set of integrated magnitude values to produce a set of normalized integrated magnitude values; and determining the presence of cargo within the container by comparing each of the normalized integrated magnitude values with corresponding threshold values.

In some implementations, the method further comprises detecting the presence of cargo within the container by identifying one of the integrated normalized magnitude values exceeding its corresponding threshold value; identifying the subrange of bin values associated with the one of the integrated normalized magnitude values exceeding its corresponding threshold value; and determining a distance of the cargo from the radar device based on one or more of the respective distances represented by the bin values of the subrange of bin values.

In some implementations, determining a distance of the cargo from the radar device is based on a measure of central tendency of the bin values of the subrange of bin values.

In some implementations, detecting the absence of cargo within the container by determining that none of the integrated normalized magnitude values exceed the corresponding threshold values.

In some implementations, prior to transmitting the first electromagnetic signal, the method may further comprise determining the set of integrated base magnitude values when the container is empty and storing the set of integrated base magnitude values in memory.

In some implementations, determining the set of integrated base magnitude values comprises the steps of transmitting, by a radar device, an initial electromagnetic signal within the container when empty; receiving, at the radar device, an initial reflected electromagnetic signal corresponding to the initial electromagnetic signal; converting the initial reflected electromagnetic signal into a set of base magnitude values corresponding to the set of bin values; and integrating, using a moving window, the base magnitude values over the successive subranges of bin values to determine the set of integrated base magnitude values.

In some implementations, determining the set of integrated base magnitude values comprises obtaining sets of reflected electromagnetic signals within the container when empty; converting the sets of electromagnetic signals into sets of base magnitude values corresponding to the set of bin values; integrating using a moving window each set of base magnitude values over the successive subranges of bin values to produce sets of provisional integrated base magnitude values; and averaging the sets of provisional integrated base magnitude values to obtain the set of integrated base magnitude values.

In some implementations, each subrange includes an equal number of bin values, and there is overlap between the bin values associated with a particular subrange and the bin values associated with an adjacent subrange.

In some implementations, the overlap is equal to the number of bin values in each subrange minus one.

In accordance with yet another aspect of the present application, there may be provided a non-transitory computer-readable storage medium comprising processor-executable instructions which, when executed, configure a processor to transmit, by a radar device, a first electromagnetic signal within the container; receive, at the radar device, a first reflected electromagnetic signal corresponding to the first electromagnetic signal; convert the first reflected electromagnetic signal into a set of first magnitude values corresponding to a set of bin values, each bin value representing a respective distance from the radar device; integrate, using a moving window, the first magnitude values over successive subranges of bin values to produce a set of integrated magnitude values; subtract a set of integrated base magnitude values from the set of integrated magnitude values to produce a set of normalized integrated magnitude values; and determine the presence of cargo within the container by comparing each of the normalized integrated magnitude values with corresponding threshold values.

Other aspects and features of the present application will be understood by those of ordinary skill in the art from a review of the following description of examples in conjunction with the accompanying figures.

In the present application, the terms "about", "approximately", and "substantially" are meant to cover variations that may exist in the upper and lower limits of the ranges of values, such as variations in properties, parameters, and dimensions. In a non-limiting example, the terms "about", "approximately", and "substantially" may mean plus or minus 10 percent or less.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Reference is made to FIG. 1, which illustrates an example operating environment 100 in accordance with an embodiment of the present application. The example operating environment 100 includes a container 102, shown in connection with a semi-truck 104.

The container 102 contains a radar device 106 located at a first end of the container 102. The radar device 106 may be a millimetre wave (mmWave) radar device. The container 102 also contains cargo 108A-D, located at various distances from the radar device 106. The radar device 106 transmits a first electromagnetic signal 110 within the container 102. As shown, the first electromagnetic signal 110 is reflected from surfaces within the container 102, resulting in a first reflected electromagnetic signal 112. The first reflected electromagnetic signal 112 is subsequently received at the radar device 106.

Figure 2:
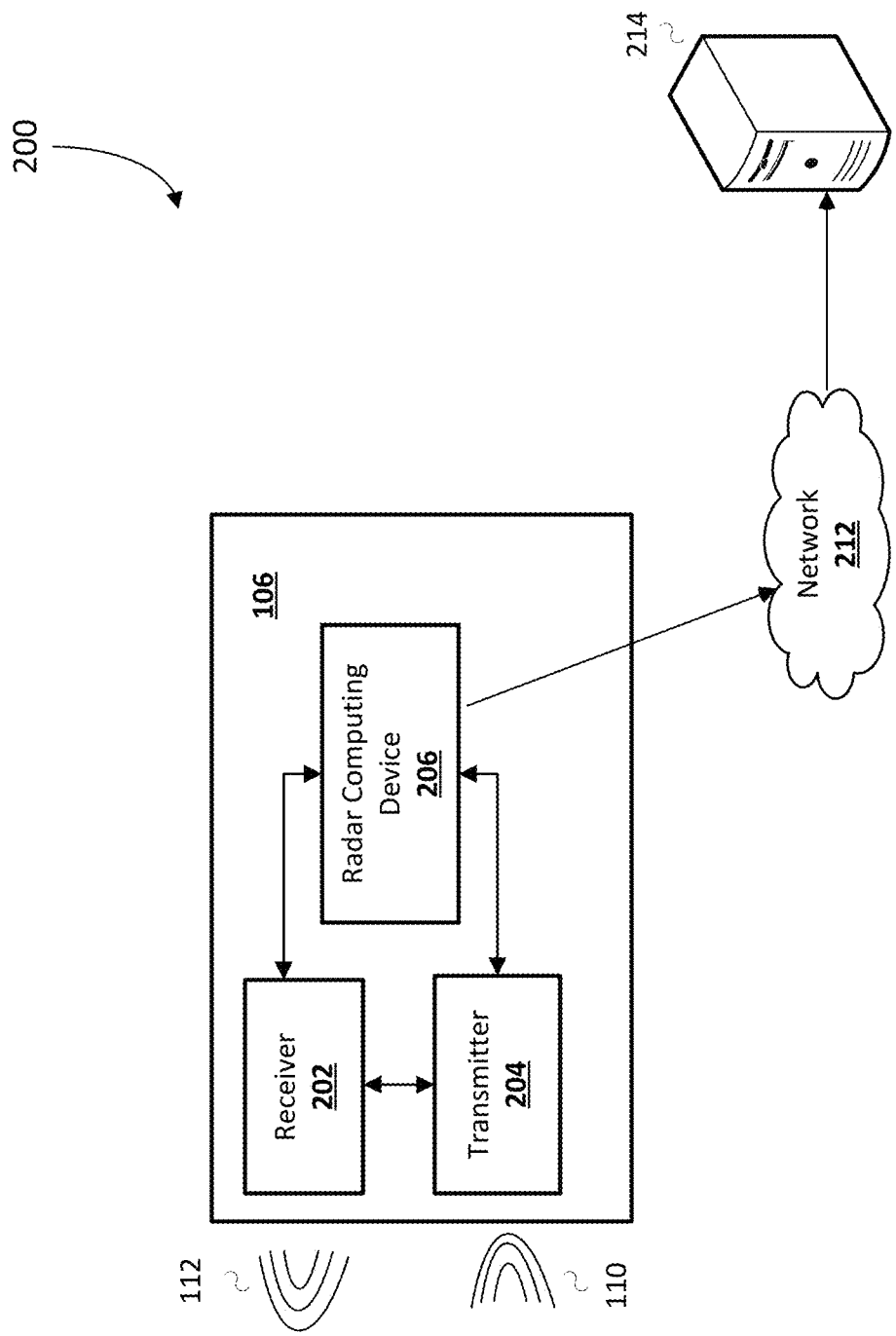
FIG. 2 is a schematic operation diagram illustrating an operating environment of an example embodiment.

Reference is now made to FIG. 2, which is a schematic operation diagram illustrating an operating environment of an example embodiment. As shown, the system 200 includes a radar device 106 and a first computing device 214 coupled to one another through a network 212, which may include a public network such as the Internet and/or a private network. In many implementations, the first computing device 214 is onboard the container or the vehicle to which the container is attached. The first computing device 214 may be connected to the radar device 106 through a wired or wireless communication channel, or a combination of both. In some implementations, the radar device 106 and the first computing device 214 may be in geographically disparate locations. Put differently, the radar device 106 and the first computing device 214 may be located remote from one another.

The first computing device 214 is a computer system. The first computing device 214 may take a variety of forms including, for example, a mobile communication device such as a smartphone, a tablet computer, a wearable computer such as a head-mounted display or smartwatch, a laptop or desktop computer, or a computing device of another type. The first computing device 214 may be a dedicated special-purpose computing device serving as a gateway for gathering, analyzing, and communicating onboard sensor data regarding the container and/or the vehicle to remote systems or for display within the vehicle. In some instances, the on-board sensor data may include data from location sensors (e.g. GPS modules), temperature sensors, motion sensors, humidity sensors, or other such sensors.

The radar device 106 includes a variety of modules. In some implementations, the radar device 106 may include a receiver 202, a transmitter 204, and a radar computing device 206. As illustrated, the foregoing example modules of the radar device 106 are in communication with one another.

The transmitter 204 includes an antenna. The transmitter 204 may transmit electromagnetic signals by generating a radio frequency alternating current and then applying this current to the antenna. In some implementations, the transmitter 204 may transmit a first electromagnetic signal 110 within a container, such as the container 102 shown in FIG. 1. The first electromagnetic signal 110 may comprise first electromagnetic waves.

The receiver 202 may receive electromagnetic signals and may convert the information carried by the electromagnetic signals to a usable form. The receiver 202 includes, an antenna. The receiver 202 may produce an electrical signal based on induced signals from the reflected electromagnetic signals received by the antenna. In some implementations, the receiver 202 may receive a first reflected electromagnetic signal 112 based on reflections of the first electromagnetic signal 110. The first reflected electromagnetic signal 112 may comprise first reflected electromagnetic waves.

In some implementations, the transmitter 204 and the receiver 202 may comprise a single module known as a transceiver.

The network 212 is a computer network. In some embodiments, the network 212 may be an internetwork such as may be formed of one or more interconnected computer networks. For example, the network 212 may be or may include an Ethernet network, an asynchronous transfer mode (ATM) network, a wireless network, a telecommunications network, or the like.

Figure 3:
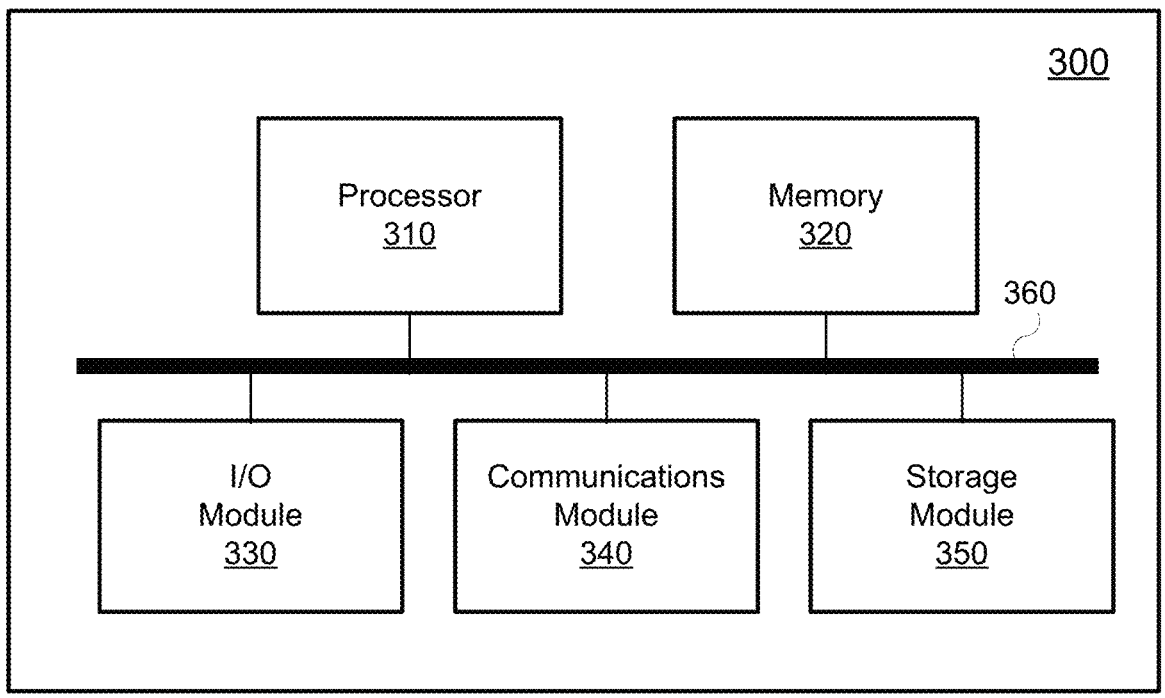
FIG. 3 is a high-level schematic diagram of an example computing device.

FIG. 3 is a high-level operation diagram of an example computing device 300. In some embodiments, the example computing device 300 may be exemplary of one or more of the radar computing device and the first computing device. The example computing device 300 includes a variety of modules. For example, as illustrated, the example computing device 300, may include a processor 310, a memory 320, an input-output (I/O) module 330, a communications module 340 and a storage module 350. As illustrated, the foregoing example modules of the example computing device 300 are in communication over a bus 360.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are a computer-readable medium. A computer-readable medium may be organized using a file system such as may be administered by an operating system governing overall operation of the example computing device 300.

The I/O module 330 is an input module and an output module. As an input module, the I/O module 330 allows the example computing device 300 to receive input from components of the example computing device 300. In some the I/O module 330 may allow the example computing device 300 to provide output to one or more output devices and/or receive input from one or more input devices. In some embodiments such as, for example, potentially where the example computing device 300 corresponds to the radar computing device, the I/O module 330 may allow the radar computing device to provide output to one or more output devices and/or receive input from one or more input devices. For example, in some such embodiments, the I/O module 330 may be used in providing output via a display of the radar computing device 206 and/or in receiving input therefrom (e.g., if the display is a touchscreen). In another example, in some embodiments, such as, for example, potentially where the example computing device 300 corresponds to the first computing device, the I/O module 330 may allow the first computing device to provide output via one or more output devices such as, for example, via a screen of the first computing device and/or to receive input from one or more input devices such as, for example, from a keyboard and/or a pointing device (e.g., a mouse, trackball, trackpad, or the like).

The communications module 340 allows the example computing device 300 to communicate with other electronic devices and/or various communications networks. For example, the communications module 340 may allow the example computing device 300 to send or receive communications signals. Communications signals may be sent or received according to one or more protocols or according to one or more standards. For example, the communications module 340 may allow the example computing device 300 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. The communications module 340 may allow the example computing device 300 to communicate using near-field communication (NFC), via Wi-Fi™, using Bluetooth™ or via some combination of one or more networks or protocols. In some embodiments, all or a portion of the communications module 340 may be integrated into a component of the example computing device 300. For example, the communications module 340 may be integrated into a communications chipset.

The storage module 350 allows the example computing device 300 to store and retrieve data. In some embodiments, the storage module 350 may be formed as a part of the memory 320 and/or may be used to access all or a portion of the memory 320. Additionally or alternatively, the storage module 350 may be used to store and retrieve data from persisted storage other than the persisted storage (if any) accessible via the memory 320. In some embodiments, the storage module 350 may be used to store and retrieve data in a database. A database may be stored in persisted storage. Additionally or alternatively, the storage module 350 may access data stored remotely such as, for example, as may be accessed using a local area network (LAN), wide area network (WAN), personal area network (PAN), and/or a storage area network (SAN). In some embodiments, the storage module 350 may access data stored remotely using the communications module 340. In some embodiments, the storage module 350 may be omitted and its function may be performed by the memory 320 and/or by the processor 310 in concert with the communications module 340 such as, for example, if data is stored remotely. The storage module may also be referred to as a data store.

Software comprising instructions is executed by the processor 310 from a computer-readable medium. For example, software may be loaded into random-access memory from persistent storage of memory 320. Additionally, or alternatively, instructions may be executed by the processor 310 directly from read-only memory of memory 320.

Figure 4:
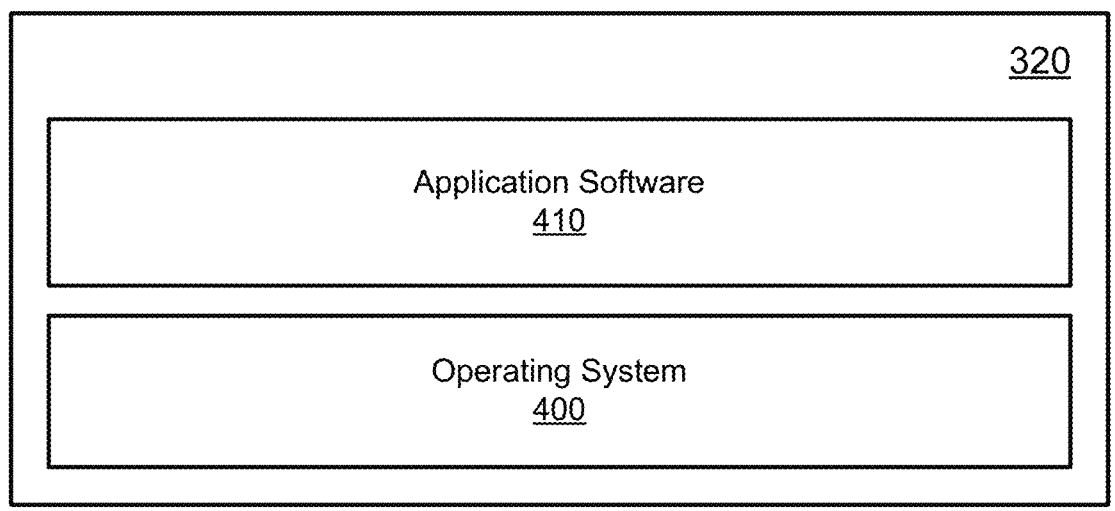
FIG. 4 shows a simplified organization of software components stored in memory of the example computing device of FIG. 3.

FIG. 4 depicts a simplified organization of software components stored in memory 320 of the example computing device. As illustrated these software components include an operating system 400 and application software 410.

The operating system 400 is software. The operating system 400 allows the application software 410 to access the processor, the memory, the I/O module and the communications module. The operating system 400 may be, for example, Apple's iOS™ Google's Android™, Linux™, Microsoft's Windows™, or the like.

The application software 410 adapts the example computing device, in combination with the operating system 400, to operate as a device performing particular functions. For example, the application software 410 may cooperate with the operating system 400 to adapt a suitable embodiment of the example computing device to operate as the radar device and the first computing device.

One method of detecting cargo within a container may involve transmitting an electromagnetic wave within the container and receiving a reflected electromagnetic wave. The reflected electromagnetic wave may then be then analyzed and, based on the reflections, the presence of cargo within the container may be identified.

Figure 5:
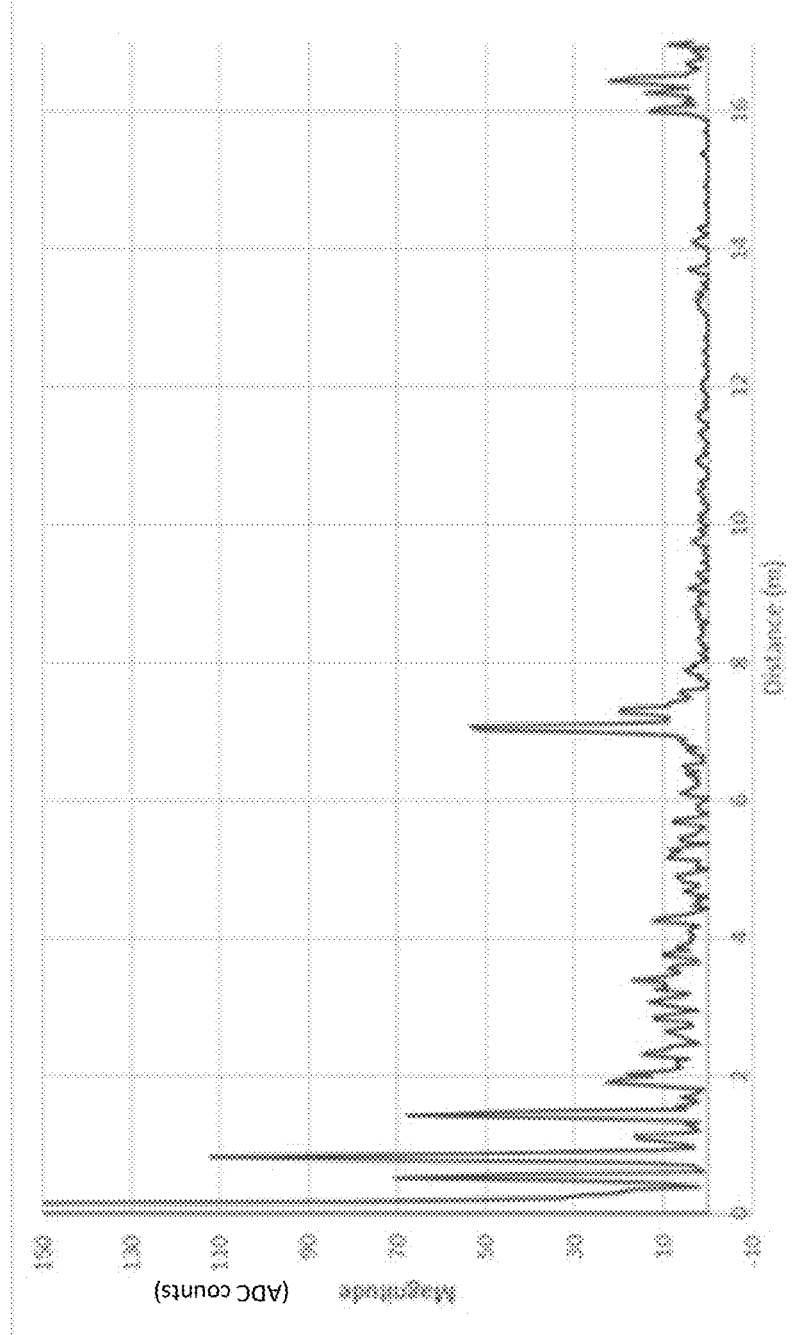
FIG. 5 shows a line graph depicting the magnitude of a reflected electromagnetic signal as a function of distance in a container having cargo.

Reference is now made to FIG. 5, which shows a line graph 500 depicting the magnitude of a reflected electromagnetic signal as a function of distance from the radar device 106 (FIG. 1). The line graph 500 shows an example of a received reflected electromagnetic signal. Although shown in line graph form for ease of illustration, it will be appreciated that in many embodiments, the radar device may be configured to output a set of discrete magnitude readings. In particular, the radar device may be configured to output a discrete magnitude value corresponding to "bins" that represent discrete distances from the radar device. In some embodiments, the size of the bins may be modified and/or adjusted. In this example, each bin represents 4.34 cm in distance.

As shown in the line graph 500, there is a magnitude peak of about 53.8 analog-to-digital converter (ADC) counts at or around 7.07 m from the radar device. The magnitude peak may be indicative of the presence of an object, such as cargo, at this location.

Following receipt of the reflected electromagnetic wave, the received reflected signals (or, in many cases, the set of discrete magnitude values) may be normalized based on comparison with a reflected radar signal obtained using the same radar device and container when empty, i.e., a baseline signal. The baseline signal may be obtained by transmitting and receiving an electromagnetic signal within the container when the container is known to be empty.

Figure 6:
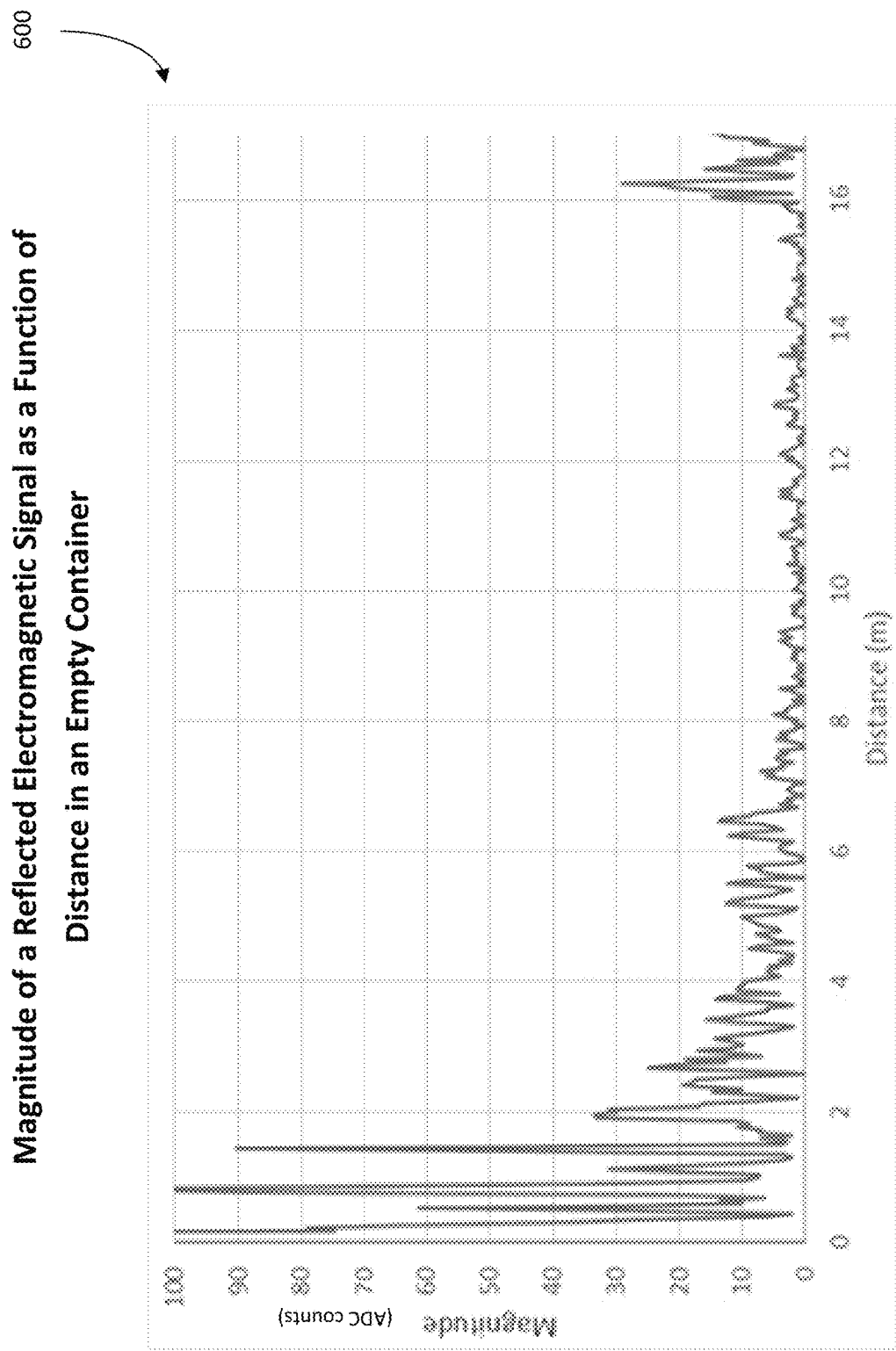
FIG. 6 shows a line graph depicting the magnitude of a reflected electromagnetic signal as a function of distance in an empty container.

Reference is now made to FIG. 6, which shows a line graph 600 depicting the magnitude of a reflected electromagnetic signal as a function of distance from the radar device when the container is empty. In this example, each bin represents 4.34 cm in distance.

The received electromagnetic signal for identifying cargo is normalized by subtracting the baseline signal from the received electromagnetic signal. The resulting normalized signal may then be compared with one or more sets of pre-defined threshold values. The threshold values may be programmable. An object, such as cargo, may then be detected at a distance where the normalized signal is greater than the one or more pre-defined threshold values at that distance.

Figure 7:
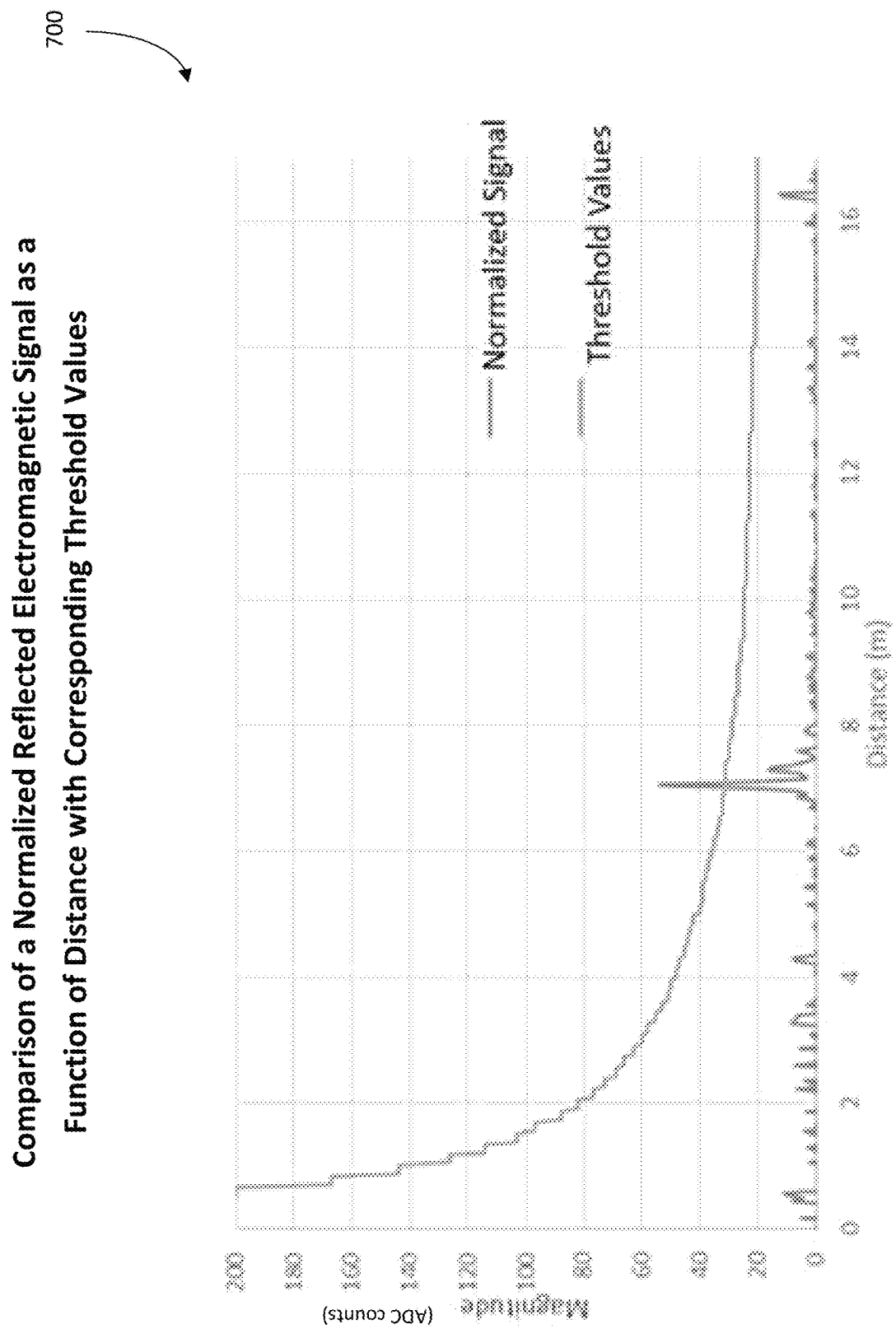
FIG. 7 shows a line graph depicting a comparison of the magnitude of a normalized reflected electromagnetic signal as a function of distance with corresponding threshold values.

FIG. 7 shows a line graph 700 depicting a comparison of a normalized reflected electromagnetic signal as a function of distance from the radar device with corresponding threshold values. Based on that comparison, the line graph 700 indicates there may be an object, such as cargo, at a distance of about 7.07 m from the radar device. At this distance, an object peak of 53.8 ADC counts is shown, which is greater than the corresponding threshold value at that distance.

Electromagnetic signals may be subject to wave interference caused by the superimposition of two or more colliding electromagnetic waves. The electromagnetic waves may then be reflected from various objects, such as the cargo within the container, and such as the walls of the container. As a result, some of the electromagnetic waves may meet and superimposition of the electromagnetic waves may occur.

When two electromagnetic waves superimpose, constructive interference may occur, Constructive interference may result in a resulting reflected electromagnetic wave having a higher amplitude than the two composite waves. Additionally or alternatively, when two electromagnetic waves superimpose, destructive interference may occur. Destructive interference may result in a resulting reflected electromagnetic having a lower amplitude than the two composite waves.

Figure 8:
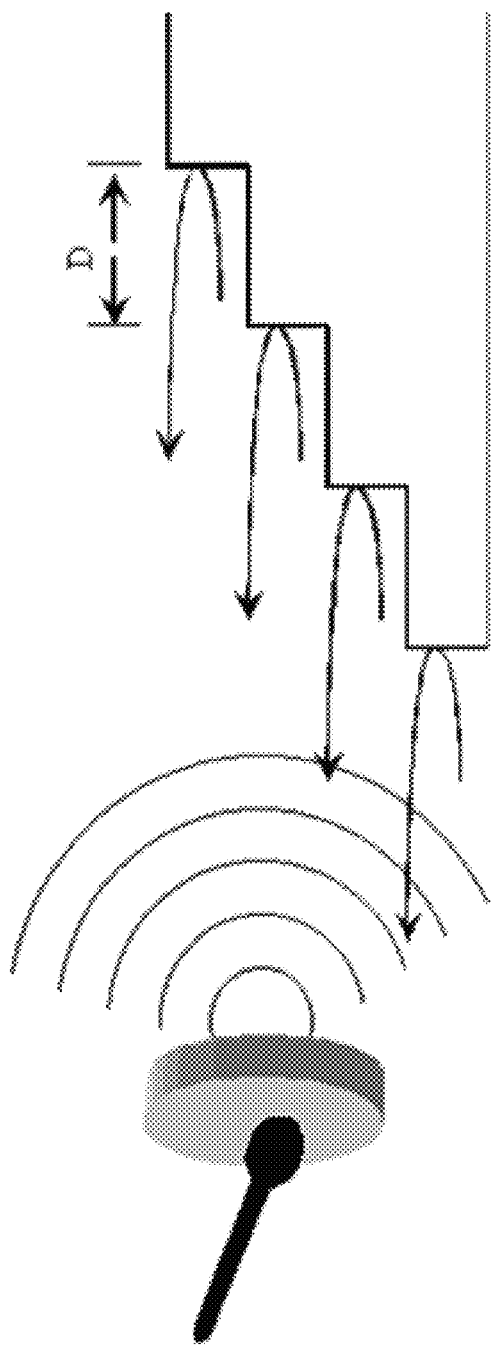
FIG. 8 is a schematic illustration of a beating drum in front of a set of steps.

An example of destructive interference involves the reflection of sound waves from steps. FIG. 8 illustrates a particular example involving a beating drum in front of a set of bleacher steps. With reference to FIG. 8, if the depth of each bleacher step is given by D, then the conditions for destructive interference are D=¼ λ and the conditions for constructive interference are D=½ λ. The drum may produce sound waves of various frequencies. The sound waves having frequencies that result in constructive interference will produce reflected sound waves having high amplitudes. As a result, although the drum itself may not produce a distinct pitch, the reflected sound may have a distinct pitch corresponding to the frequencies of the reflected sound waves that interfere constructively.

The wavelength of a mmWave signal may be at the mm to cm range. When an mmWave signal is reflected at a distance from a large flat surface, (such as a cardboard box), the signal phase of the resulting reflected electromagnetic waves may be shifted by more than π radians. This phase shift may result in constructive interference, thus producing resulting reflected electromagnetic waves having large amplitudes. The large amplitude waves may be well-suited for object, such as cargo, detection. This phase shift may also result in destructive interference, thus producing resulting reflected electromagnetic waves having a small amplitude. The small amplitude reflected electromagnetic waves may result in a reflected electromagnetic signal of lower magnitude. As a result, an object, such as cargo, may not be detected because the reflected electromagnetic signal is below the corresponding threshold values. In this way, destructive interference may result in undetected objects, such as cargo.

Figure 9:
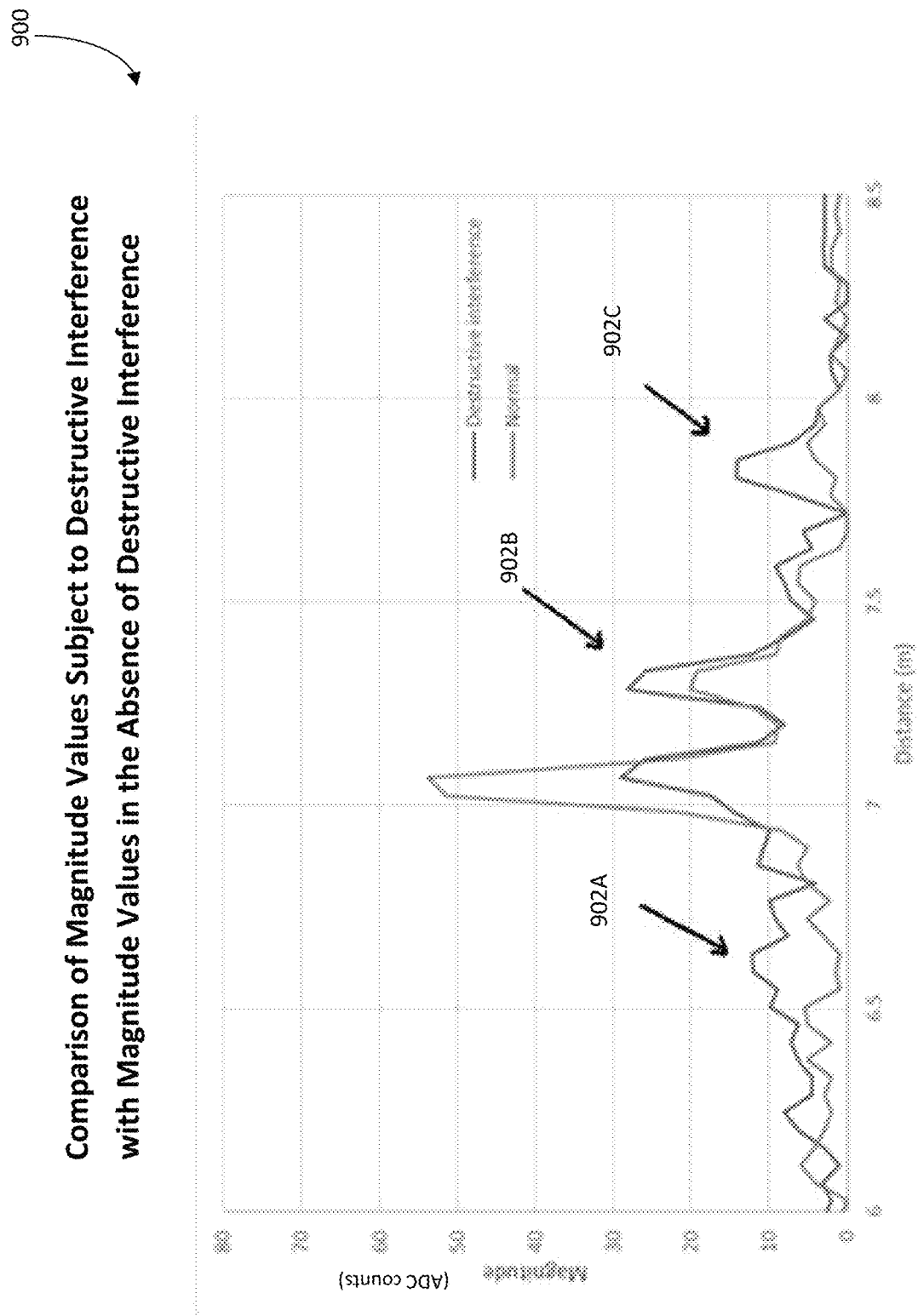
FIG. 9 shows a line graph depicting a comparison of magnitude values subject to destructive interference with magnitude values in the absence of destructive interference.

As described, destructive interference may reduce the amplitude of the reflected electromagnetic waves returned from a particular object. However, the energy of these reflected electromagnetic waves does not disappear. Instead, this energy shifts may be observable within other reflected electromagnetic waves shifted in time and may result in an increased in the magnitude of reflected electromagnetic waves attributed to nearby bins. This shift in energy is demonstrated by a line graph 900 shown in FIG. 9. The line graph 900 shows a comparison of magnitude values subject to destructive interference with magnitude values in the absence of destructive interference. As shown in FIG. 9, it may be observed that the magnitude of the values at the bin corresponding to the object are decreased, but that the magnitude of the values in adjacent or nearby bins is increased when the signal is subject to destructive interference. Peaks in the signal representing instances of increase are indicated by the arrows 902A-C on the line graph. However, none of the peaks corresponding to the distance of the object are above the established threshold values. Lowering the threshold values might provide for the identification of the peaks but may result in noise being falsely detected as objects.

Figure 10:
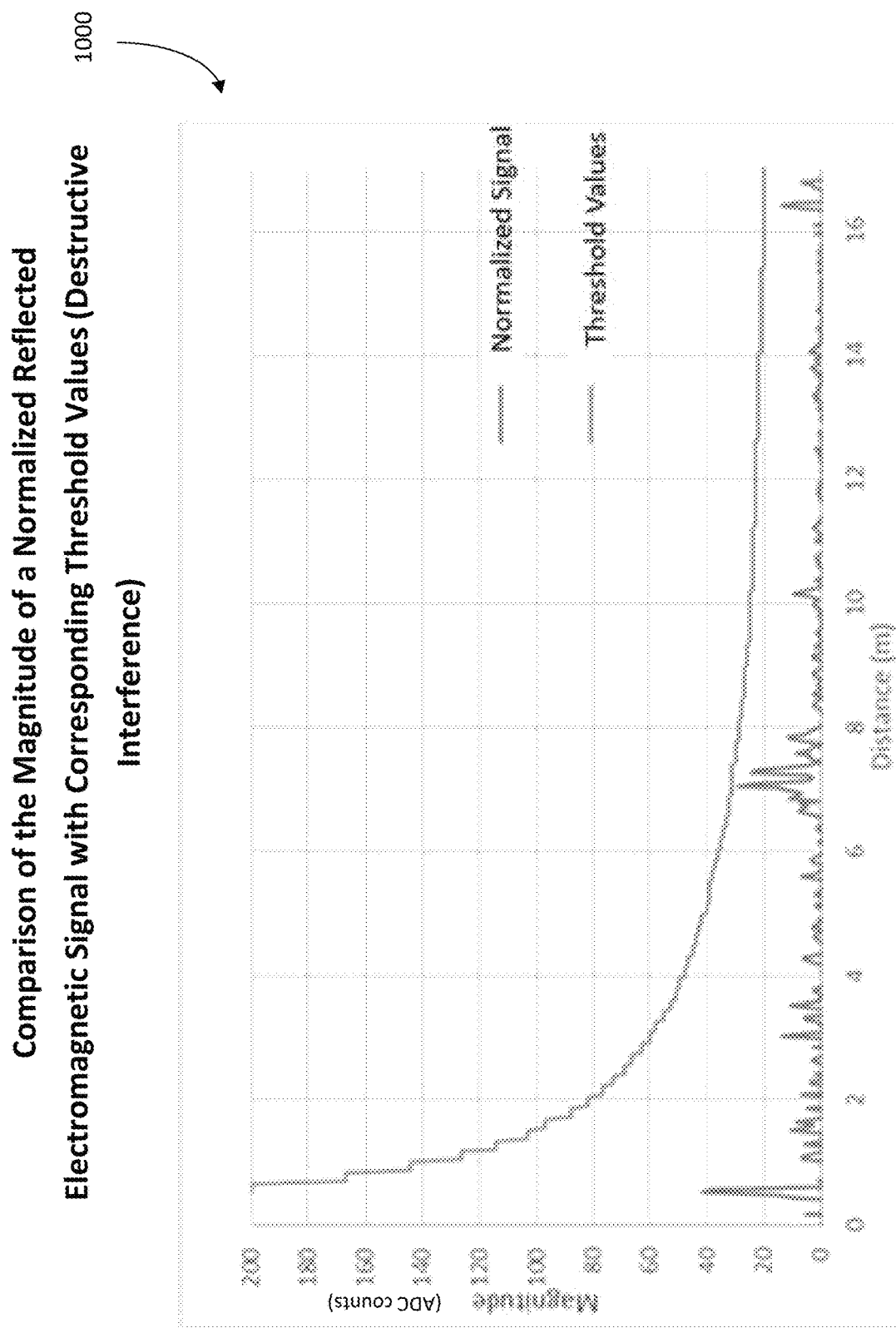
FIG. 10 shows a line graph depicting a comparison of a normalized reflected electromagnetic signal under destructive interference as a function of distance with corresponding threshold values.

Reference is now made to FIG. 10, which shows a line graph 1000 depicting a comparison of the magnitude of a normalized first reflected electromagnetic signal with corresponding pre-defined threshold values. In this example, the normalized first reflected electromagnetic signal is obtained under conditions having destructive interference. The line graph 1000 illustrates an effect that destructive interference may have on a normalized first reflected electromagnetic signal. The line graph 1000 shows a magnitude peak of about 29.2 ADC counts at or around 7.07 m from the radar device. The distance of the magnitude peak of the normalized first reflected electromagnetic signal is consistent with the distance of the magnitude peak of the first reflected electromagnetic signal shown in FIG. 7, and the magnitude peak may be indicative of the presence of an object, such as cargo, at this location. However, in this example, due to the effect of destructive interference, the magnitude peak is not detected as it does not exceed the pre-defined threshold.

Figure 11:
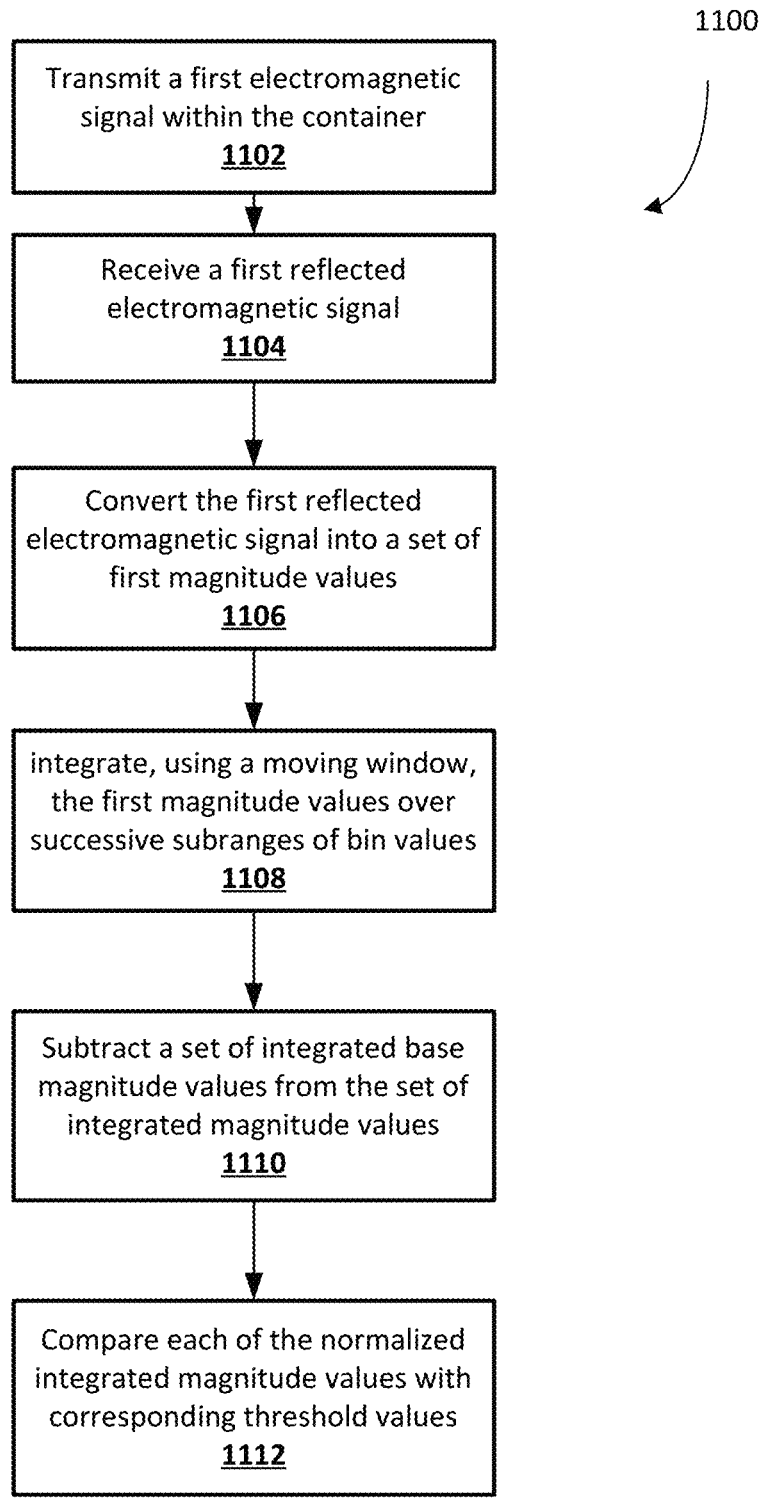
FIG. 11 is a flowchart of a method of determining the presence of cargo within a container.

Reference is now made to FIG. 11, which is a flow chart showing operations of a method 1100 which may be performed by the system 200 (FIG. 2).

At operation 1102, the radar device transmits a first electromagnetic signal within the container. At operation 1104, the radar device receives a first reflected electromagnetic signal corresponding to the first electromagnetic signal.

In some embodiments, the radar device may transmit a first electromagnetic signal towards the interior of the container. The first electromagnetic signal may be comprised of a set of first electromagnetic waves. The set of first electromagnetic waves may be transmitted by the radar device in a series of transmit pulses. When the first electromagnetic signal contacts one or more of the cargo and/or the interior of the container, some of the first electromagnetic signal may be absorbed by and may penetrate into one or more of the cargo and/or the interior of the container. However, additionally or alternatively, when the first electromagnetic signal contacts one or more of the cargo and/or the interior of the container, the first electromagnetic signal may be reflected in many directions. The reflected electromagnetic signal may be described as the first reflected electromagnetic signal. The first reflected electromagnetic signal may be detected by the radar device and may be processed by the radar device to determine properties of one or more of the cargo.

At operation 1106, the system converts the first reflected electromagnetic signal into a set of first magnitude values. The set of first magnitude values correspond to a set of bin values, and each bin value represents a respective distance from the radar device.

Each of the first reflected electromagnetic waves may be associated with a corresponding transmit pulse. The processor may compare the timing of the corresponding transmit pulse to the time of arrival of each of the first reflected electromagnetic waves. In this way, the processor may determine a time interval associated with each of the first reflected electromagnetic waves. Next, the processor may associate each of the first reflected electromagnetic waves with a bin value based on the associated time interval. Each bin value may represent a finite section of the full detecting range of the radar device within the container. As such, each bin value may represent a respective distance from the radar device. The processor may determine the set of first magnitude values based on the received signal strength in each bin. In this way, the system may convert the first reflected electromagnetic signal into a set of first magnitude values corresponding to a set of bin values, each bin value representing a respective distance from the radar device.

At operation 1108, the system integrates, using a moving window, the first magnitude values over successive overlapping subranges of bin values. The integration produces a set of integrated magnitude values. This operation may result in a representation of the amount of energy reflected around one or more objects, such as cargo, in the container. This representation may provide an identification of one or more objects which would not have been identified by observing the first reflected magnitude value as shown in FIG. 5.

Each subrange may include an equal number of bin values. Alternatively, each subrange may include an unequal number of bin values. Each subrange may overlap with one or more adjacent subranges. In some embodiments, each subrange includes an equal number of bin values, and there is overlap between the bin values associated with a particular subrange and the bin values associated with an adjacent subrange. In some embodiments, the overlap may be equal to the number of bin values in each subrange minus one.

In some embodiments, each of the integrated magnitude values corresponds to a bin value from within the subrange of bin values. Each of the integrated magnitude values represents a sum of the magnitudes for the bins within the subrange of bin values.

Figure 12:
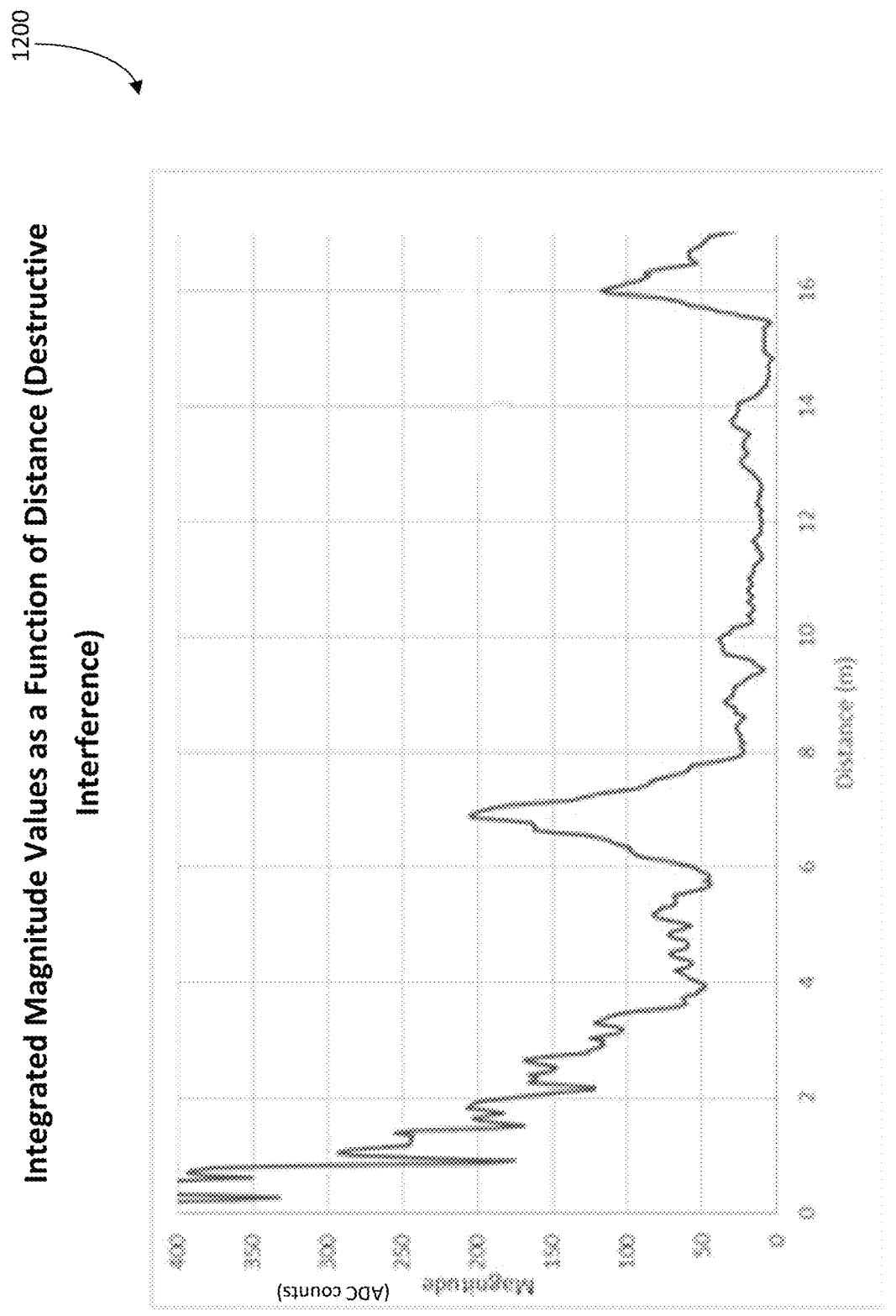
FIG. 12 shows a line graph depicting integrated magnitude values subject to destructive interference as a function of distance.

Referring now to FIG. 12, FIG. 12 shows a line graph 1200 depicting integrated magnitude values subject to destructive interference as a function of distance from the radar device. A peak having a magnitude of about 205 ADC counts at about 6.5 m is shown. The integration may be performed by first determining a length of the subranges of bin values or, equivalently, a number of bin values, i.e., a window size. In the particular example illustrated by FIG. 12, the length of the subranges is determined to be 0.48 m or 12 bins. Using a moving window, the first magnitude values over successive subranges of 12 bins are summed and/or averaged. For example, the sum of bin [0, 1, 2 . . . 11] becomes the integrated magnitude value of the first bin, and the sum of bin [1, 2, 3 . . . 12] becomes the integrated magnitude value of the second bin, etcetera.

Referring again to the method 1100 of FIG. 11, at the operation 1110, the system 200 normalizes the integrated magnitude values by subtracting a set of integrated base magnitude values from the set of integrated magnitude values. The set of integrated base magnitude values may be obtained, for example, by the method 1300 described with reference to FIG. 13, which will now be described.

Figure 13:
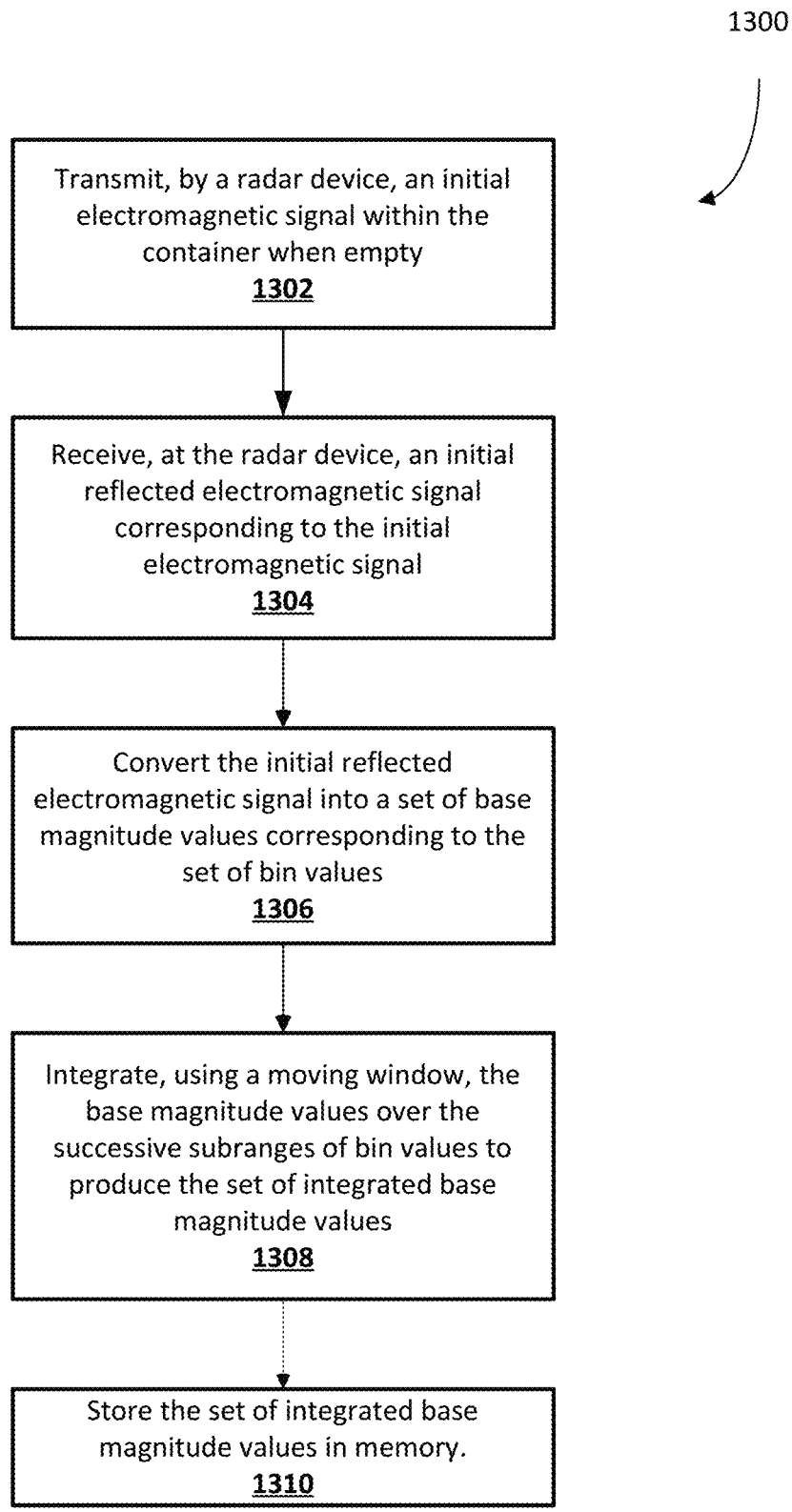
FIG. 13 is a flowchart of a method of determining integrated base magnitude values.

FIG. 13 illustrates a method 1300 for determining the set of integrated base magnitude values. At the operation 1302, the system transmits, using the radar device, an initial electromagnetic signal within the container when empty. At operation 1304, the system receives, at the radar device, an initial reflected electromagnetic signal corresponding to the initial electromagnetic signal. At operation 1306, the system converts the initial reflected electromagnetic signal into a set of base magnitude values corresponding to the set of bin values.

At operation 1308, the system integrates, using a moving window, the base magnitude values over the successive subranges of bin values to produce the set of integrated base magnitude values. The set of integrated base magnitude values may be stored in memory.

Each subrange may include an equal number of bin values. Alternatively, each subrange may include an unequal number of bin values. Each subrange may overlap with one or more adjacent subranges. In some embodiments, each subrange includes an equal number of bin values, and there is overlap between the bin values associated with a particular subrange and the bin values associated with an adjacent subrange. In some embodiments, the overlap may be equal to the number of bin values in each subrange minus one.

In some embodiments, each of the integrated magnitude values corresponds to a bin value from within the subrange of bin values. Each of the integrated magnitude values represents a sum and/or an average of the magnitudes for the bins within the subrange of bin values.

Figure 14:
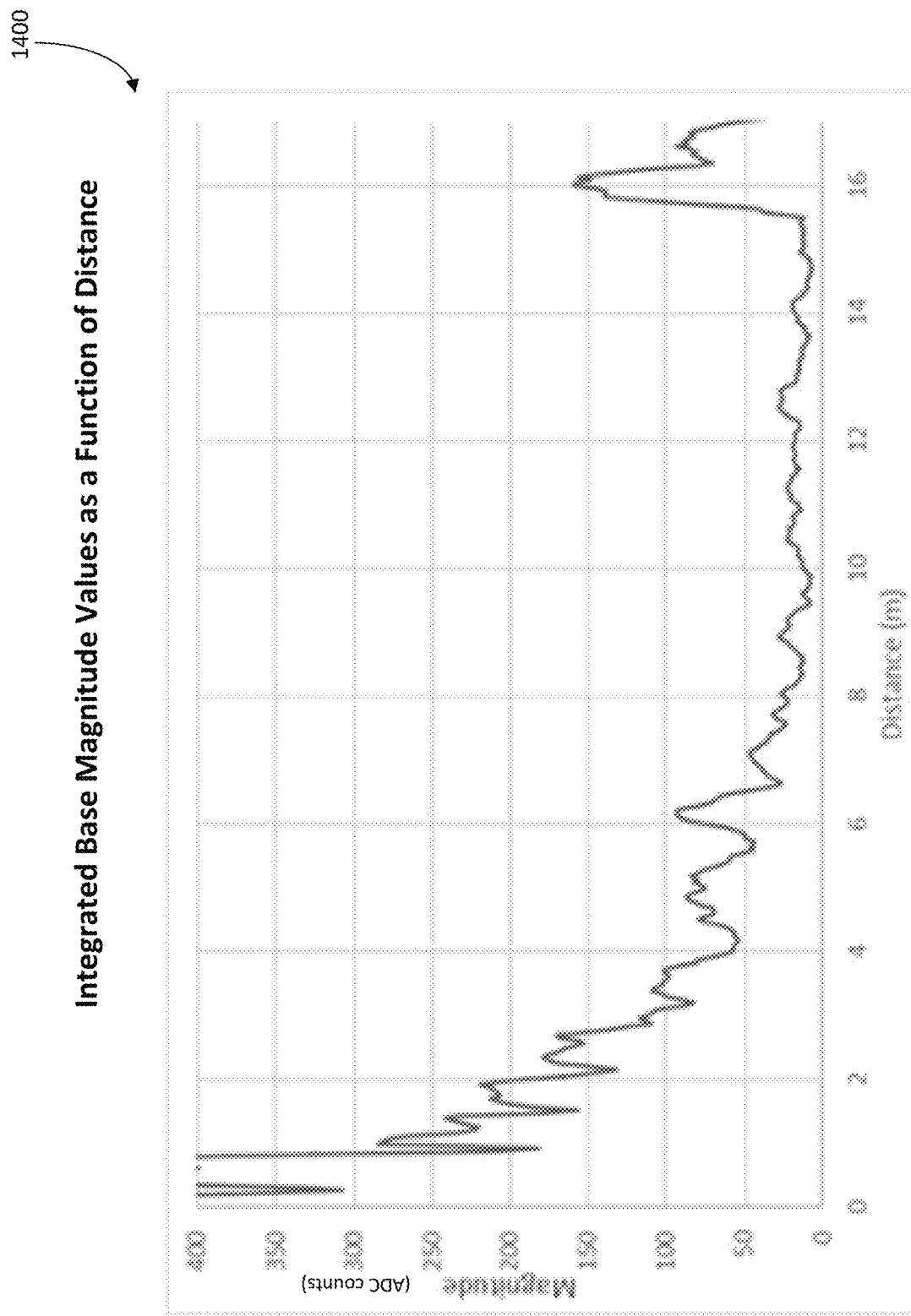
FIG. 14 shows a line graph depicting integrated base magnitude values as a function of distance.

A representation of an example received set of integrated base magnitude values corresponding to a set of bin values is illustrated by FIG. 14.

FIG. 14 shows line graph 1400, which depicts a graphical illustration of an example set of integrated base magnitude values as a function of distance from the radar device in an empty container. In this example, each bin represents 4.34 cm in distance. The set of integrated base magnitude values correspond to a signal received from an empty container.

Similar to the operation 1108 shown in FIG. 11, the integration may be performed by first determining a length of the subranges of bin values, i.e., a window size. In the particular example illustrated by FIG. 14, the length of the subranges is determined to be 0.48 m or 12 bins. Using a moving window, the first magnitude values over successive subranges of 12 bins are summed and/or averaged. For example, the sum of bin [0, 1, 2 . . . 11] becomes the integrated magnitude value of the first bin, and the sum of bin [1, 2, 3 . . . 12] becomes the integrated magnitude value of the second bin, etcetera.

In some embodiments, the integrated base magnitude values may be determined by first determining a measure of central tendency of multiple component sets of base magnitude values. For example, referring again to FIG. 13, the operations 1302 to 1306 may be performed using an empty container to determine a first component set of base magnitude values. In other words, the system may transmit, by a radar device, a first initial electromagnetic signal within the container when empty; receive, at the radar device, a first initial reflected electromagnetic signal corresponding to the first initial electromagnetic signal; and convert the first initial reflected electromagnetic signal into a set of first component base magnitude values corresponding to the set of bin values. The operations 1302 to 1306 may be performed again using the empty container to determine a second component set of base magnitude values. In other words, the system may transmit, by the radar device, a second initial electromagnetic signal within the container when empty; receive, at the radar device, a second initial reflected electromagnetic signal corresponding to the second initial electromagnetic signal; and convert the second initial reflected electromagnetic signal into a set of second component base magnitude values corresponding to the set of bin values. The operations 1302 to 1306 may be performed yet again using an empty container to determine a third component set of base magnitude values. In other words, the system may transmit, by the radar device, a third initial electromagnetic signal within the container when empty; receive, at the radar device, a third initial reflected electromagnetic signal corresponding to the third initial electromagnetic signal; convert the third initial reflected electromagnetic signal into a set of third component base magnitude values corresponding to the set of bin values. A measure of central tendency of the first, second and third component sets of base magnitude values may then be determined, resulting in the set of base magnitude values. The set of base magnitude values may then be integrated in accordance with the operation 1308.

Put another way, the set of integrated base magnitude values may be determined by obtaining sets of reflected electromagnetic signals within the container when empty; converting the sets of electromagnetic signals into sets of base magnitude values corresponding to the set of bin values; integrating using a moving window each set of base magnitude values over the successive subranges of bin values to produce sets of provisional integrated base magnitude values; and averaging the sets of provisional integrated base magnitude values to obtain the set of integrated base magnitude values.

At operation 1310, the system may store the set of integrated base magnitude values in memory.

It will be noted that the example above involving determining the integrated base magnitude values describes three iterations of determining component sets of base magnitude values. Embodiments described herein are not limited to three iterations; similar methods involving two iterations, or four or more iterations are asserted.

In some embodiments, the base magnitude values may be determined such that signal variances due to temperature, system noises and wave interference effects in the empty container are lessened or removed. In some such embodiments, the reflected electromagnetic signals may be pre-emphasized, for example, through multiplication by an offset factor.

Referring again to the method 1100 of FIG. 11, at the operation 1110, the system subtracts the set of integrated base magnitude values from the set of integrated magnitude values. The set of integrated base magnitude values may be obtained, for example, by the method 1300 described with reference to FIG. 13. The subtraction produces a set of normalized integrated magnitude values. An illustration of an example set of normalized integrated magnitude values is shown by FIG. 15.

Figure 15:
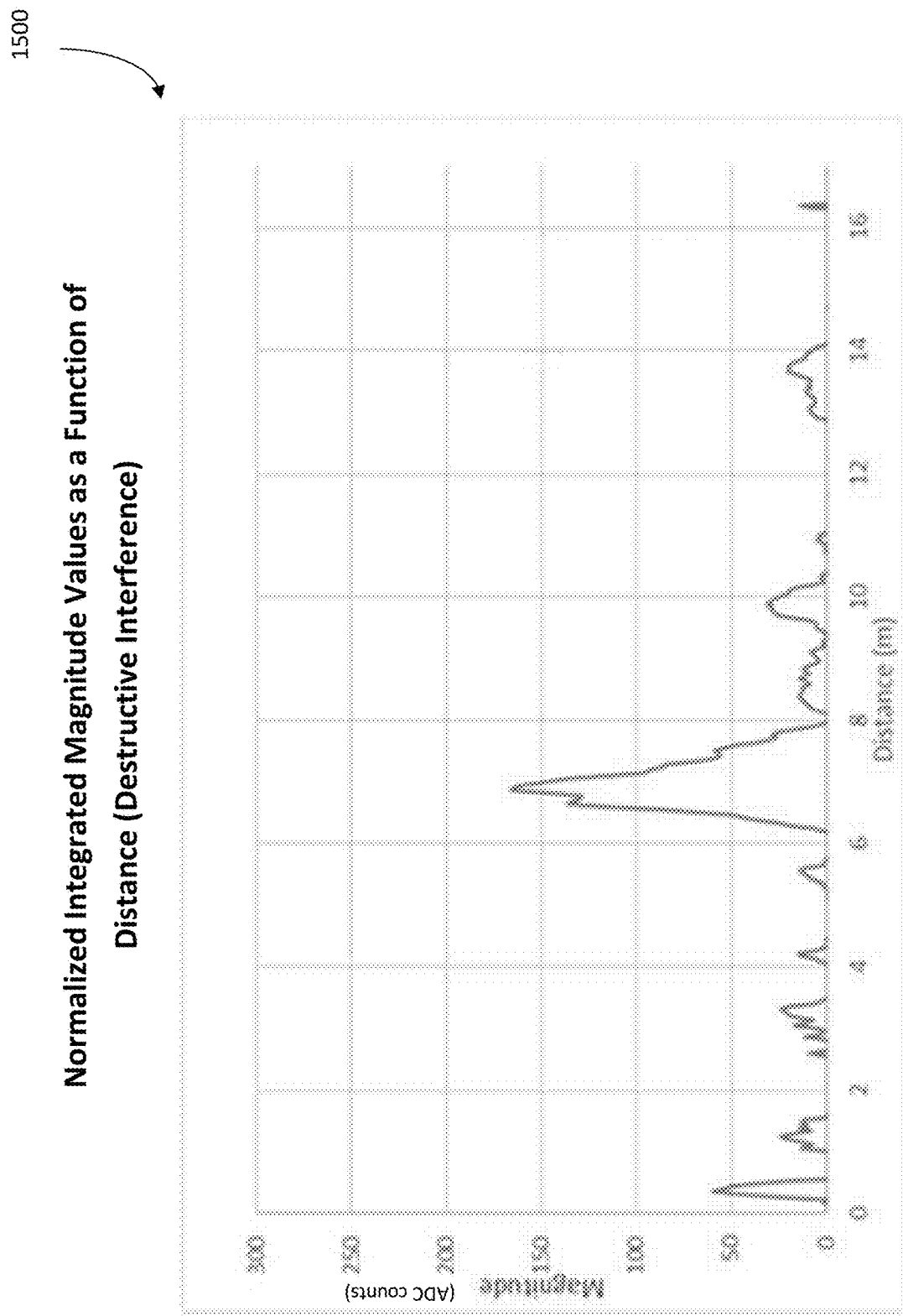
FIG. 15 shows a line graph depicting normalized integrated magnitude values subject to destructive interference as a function of distance.

FIG. 15 shows a line graph 1500 illustrating an example set of normalized integrated magnitude values subject to destructive interference as a function of distance from the radar device. A peak having a magnitude of about 166.2 ADC counts is shown at a distance of about 6.85 m. In comparison with the values illustrated in FIG. 7, the peak is more distinct and the noise is less prominent.

Referring again to FIG. 11, at operation 1112, the system compares each of the normalized integrated magnitude values with corresponding threshold values. An illustration of this comparison is shown by FIG. 16.

Figure 16:
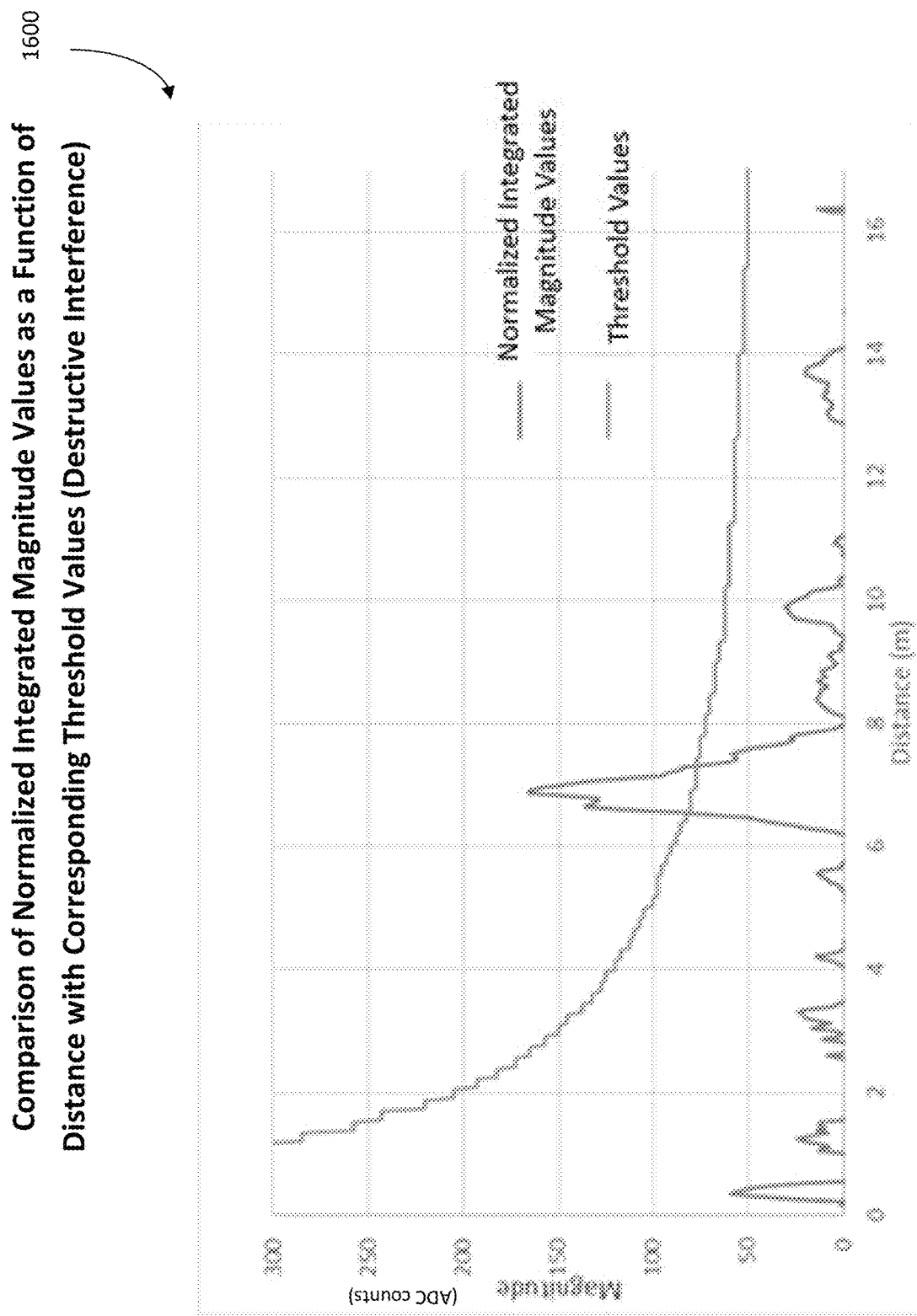
FIG. 16 shows a line graph depicting a comparison of the magnitude of normalized integrated magnitude values subject to destructive interference as a function of distance with corresponding threshold values.

FIG. 16 shows a line graph 1600 showing the function of FIG. 15 with the additional inclusion of a representation of corresponding threshold values. At an approximate distance of 6.7 m-7.2 m, the magnitude values are shown to surpass the corresponding threshold values. In some embodiments, compensation may be applied to the distance results to address offset pulled in by the integration process.

Figure 17:
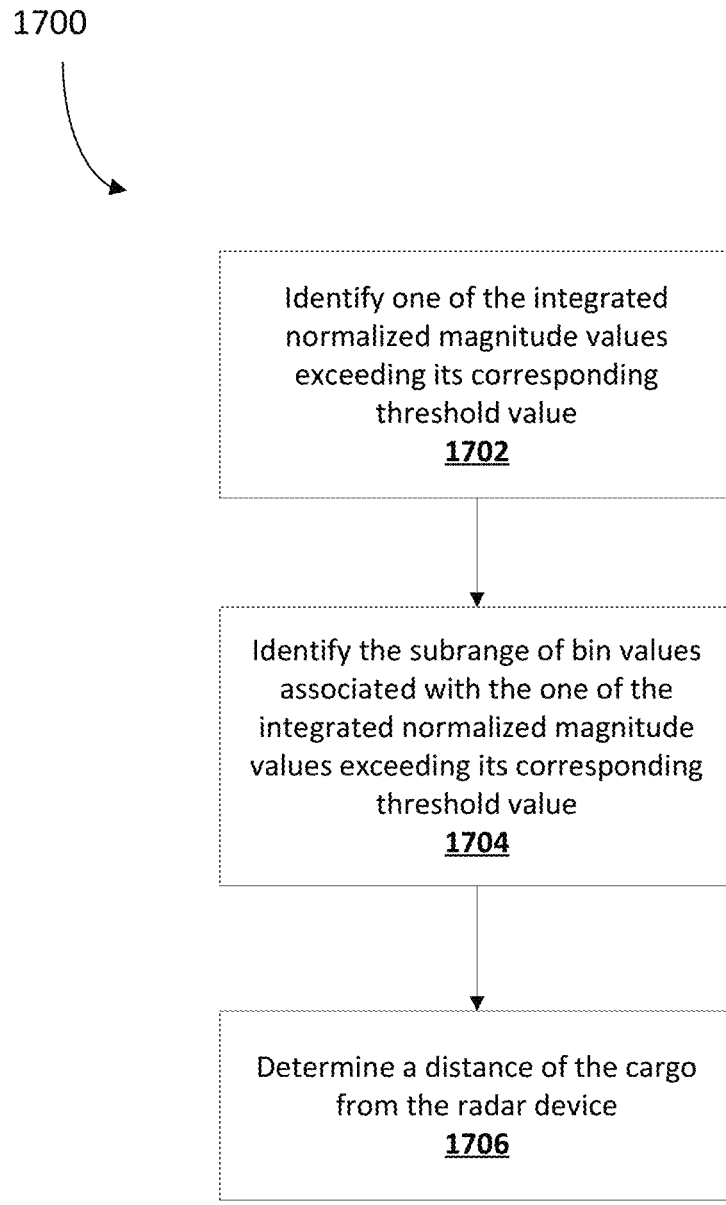
FIG. 17 is a flowchart of a method of determining a distance of cargo from a radar device.

FIG. 17 illustrates a method 1700 of detecting the presence of cargo within the container. At operation 1702, the system identifies one of the integrated normalized magnitude values exceeding its corresponding threshold value. For example, with reference to FIG. 16, the magnitude value associated with a distance of approximately 6.85 m may be identified as a result of this operation. At operation 1704, the system identifies the subrange of bin values associated with the one of the integrated normalized magnitude values exceeding its corresponding threshold value. For example, with reference to FIG. 16, the subrange of bin values associated with a magnitude of 166.2 ADC counts may be identified. At operation 1706, the system determines a distance of the cargo from the radar device. For example, with reference to FIG. 16, a distance corresponding to a distance of approximately 6.85 m from the radar device may be identified.

Figure 18:
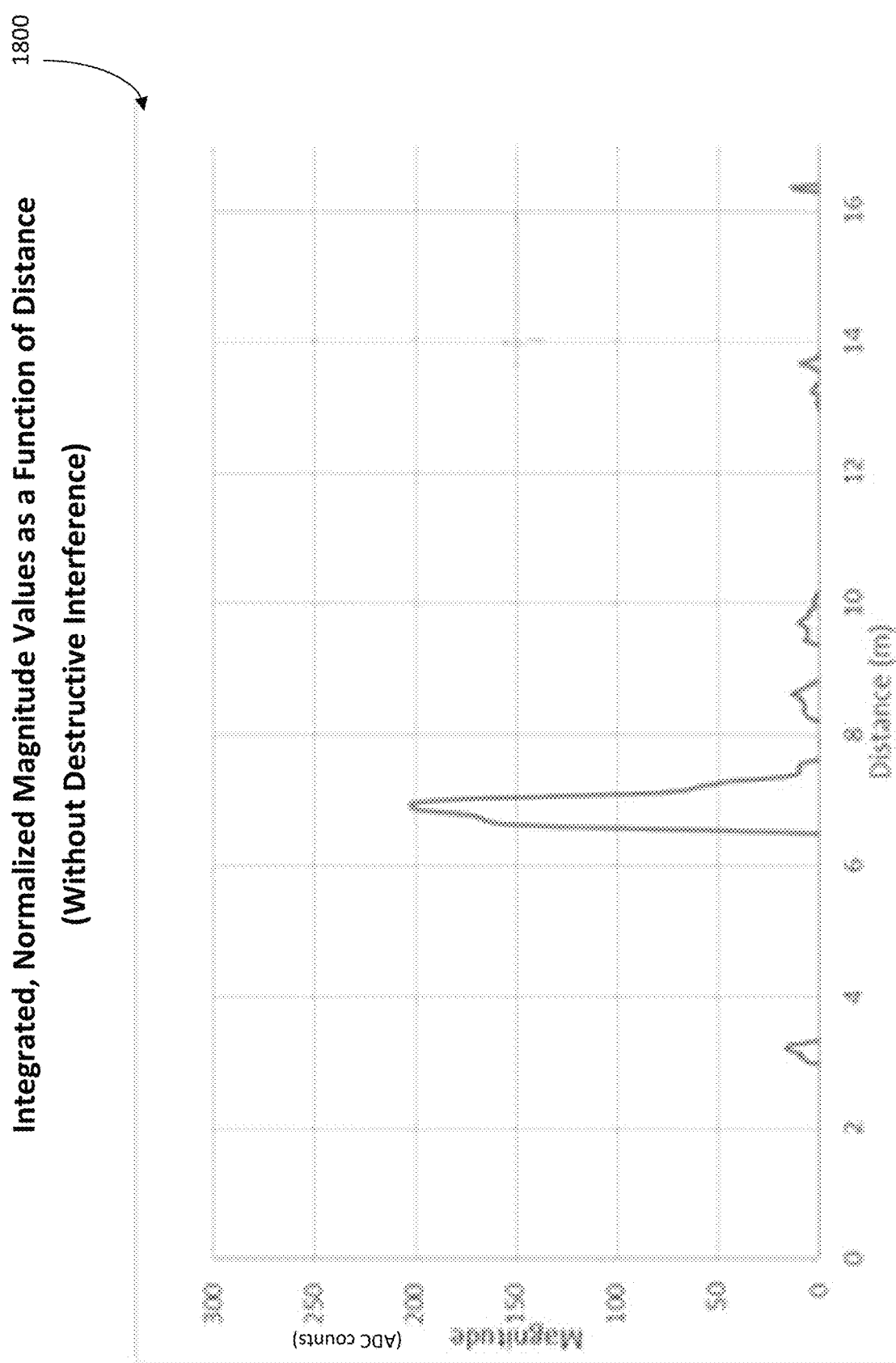
FIG. 18 shows a line graph depicting integrated, normalized magnitude values of a reflected electromagnetic signal without destructive interference as a function of distance.

FIG. 18 shows a line graph 1800 depicting integrated, normalized magnitude values as a function of distance from radar device. The magnitude values of the line graph 1800 were obtained under conditions without destructive interference. As shown, the magnitude values peak at a magnitude of 202.5 ADC counts and at a distance of 6.94 m.

It may be illustrative to compare the results under conditions of destructive interference shown with the results in the absence of destructive interference. Prior to integration, the signal ratio between the signal under destructive interference and the signal without destructive interference is 29.2/53.8=0.54. When both of these signals are integrated, the signal ratio becomes 166.2/202.5=0.82. Accordingly, the described method improves the detectability of objects under conditions of destructive interference.

Example embodiments of the present application are not limited to any particular operating system, system architecture, mobile device architecture, server architecture, or computer programming language.

It will be understood that the applications, modules, routines, processes, threads, or other software components implementing the described methods or processes may be realized using standard computer programming techniques and languages. It will be further understood that the modules implementing the described systems may be realized using one or more standard data processors or processor-executable instructions stored upon such processors. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

Certain adaptations and modifications of the described embodiments can be made. Therefore, the above discussed embodiments are considered to be illustrative and not restrictive.

What is claimed is:

1. A computing system for determining a presence of cargo within a container, the computer system comprising:
a communications module;
a processor coupled to the communications module; and
a memory coupled to the processor, the memory storing processor-executable instructions which, when executed, configure the processor to:
determine a set of integrated base magnitude values when the container is empty and storing the set of integrated base magnitude values in memory, wherein determining the set of integrated base magnitude values comprises the steps of:
transmitting, by a radar device, an initial electromagnetic signal within the container;
receiving, at the radar device, an initial reflected electromagnetic signal corresponding to the initial electromagnetic signal;
converting the initial reflected electromagnetic signal into a set of base magnitude values corresponding to the set of bin values; and
integrating, using a moving window, the base magnitude values over the successive subranges of bin values to determine a set of integrated base magnitude values; and
determine the presence of cargo in the container, wherein determining the presence of cargo in the container comprises the steps of:
transmitting, by the radar device, a first electromagnetic signal within the container;
receiving, at the radar device, a first reflected electromagnetic signal corresponding to the first electromagnetic signal;

converting the first reflected electromagnetic signal into a set of first magnitude values corresponding to a set of bin values, each bin value representing a respective distance from the radar device;

integrating, using a moving window, the first magnitude values over successive subranges of bin values to produce a set of integrated magnitude values;

subtracting the set of integrated base magnitude values from the set of integrated magnitude values to produce a set of normalized integrated magnitude values; and comparing each of the normalized integrated magnitude values with corresponding threshold values.

2. The computing system of claim 1, wherein the instructions further cause the processor to:
detect the presence of cargo within the container by:
identifying one of the integrated normalized magnitude values exceeding its corresponding threshold value;
identifying one of the subranges of bin values associated with the one of the integrated normalized magnitude values exceeding its corresponding threshold value; and
determining a distance of the cargo from the radar device based on one or more of the respective distances represented by the bin values of the one of the subranges of bin values.

3. The computing system of claim 2, wherein determining a distance of the cargo from the radar device is based on a measure of central tendency of the bin values of the one of the subranges of bin values.

4. The computing system of claim 1, wherein the instructions further cause the processor to:
detect the absence of cargo within the container by determining that none of the integrated normalized magnitude values exceed the corresponding threshold values.

5. The computing system of claim 1, wherein each subrange includes an equal number of bin values, and wherein there is overlap between the bin values associated with a particular subrange and the bin values associated with an adjacent subrange.

6. The computing system of claim 5, wherein the overlap is equal to the number of bin values in each subrange minus one.

7. The computing system of claim 1, wherein:
each of the integrated magnitude values corresponds to a bin value;
each bin value is associated with one of the successive subranges of bin values; and
each of the integrated magnitude values represents a sum of one of the subranges of bin values associated with the corresponding bin value.

8. A computing system for determining a presence of cargo within a container, the computer system comprising:
a communications module;
a processor coupled to the communications module; and
a memory coupled to the processor, the memory storing processor-executable instructions which, when executed, configure the processor to:
determine a set of integrated base magnitude values when the container is empty and storing the set of integrated base magnitude values in memory, wherein determining the set of integrated base magnitude values comprises the steps of:
obtaining sets of reflected electromagnetic signals;
converting the sets of electromagnetic signals into sets of base magnitude values corresponding to the set of bin values;
integrating using a moving window each set of base magnitude values over the successive subranges of bin values to produce sets of provisional integrated base magnitude values; and
averaging the sets of provisional integrated base magnitude values to obtain the set of integrated base magnitude values; and
transmit, by a radar device, a first electromagnetic signal within the container; and
determine the presence of cargo in the container, wherein determining the presence of cargo in the container comprises the steps of:
receiving, at the radar device, a first reflected electromagnetic signal corresponding to the first electromagnetic signal;
converting the first reflected electromagnetic signal into a set of first magnitude values corresponding to a set of bin values, each bin value representing a respective distance from the radar device;
integrating, using a moving window, the first magnitude values over successive subranges of bin values to produce a set of integrated magnitude values;
subtracting the set of integrated base magnitude values from the set of integrated magnitude values to produce a set of normalized integrated magnitude values; and
comparing each of the normalized integrated magnitude values with corresponding threshold values.

9. The computing system of claim 8, wherein the instructions further cause the processor to:
detect the presence of cargo within the container by:
identifying one of the integrated normalized magnitude values exceeding its corresponding threshold value;
identifying one of the subranges of bin values associated with the one of the integrated normalized magnitude values exceeding its corresponding threshold value; and
determining a distance of the cargo from the radar device based on one or more of the respective distances represented by the bin values of the one of the subranges of bin values.

10. The computing system of claim 9, wherein determining a distance of the cargo from the radar device is based on a measure of central tendency of the bin values of one of the subranges of bin values.

11. The computing system of claim 8, wherein the instructions further cause the processor to:
detect the absence of cargo within the container by determining that none of the integrated normalized magnitude values exceed the corresponding threshold values.

12. The computing system of claim 8, wherein each subrange includes an equal number of bin values, and wherein there is overlap between the bin values associated with a particular subrange and the bin values associated with an adjacent subrange.

13. The computing system of claim 12, wherein the overlap is equal to the number of bin values in each subrange minus one.

14. The computing system of claim 8, wherein:
each of the integrated magnitude values corresponds to a bin value;

each bin value is associated with one of the successive subranges of bin values; and each of the integrated magnitude values represents a sum of one of the subranges of bin values associated with the corresponding bin value.

15. A method for determining a presence of cargo within a container, the method comprising:

determining a set of integrated base magnitude values when the container is empty and storing the set of integrated base magnitude values in memory, wherein determining the set of integrated base magnitude values comprises the steps of:

transmitting, by a radar device, an initial electromagnetic signal within the container when empty;

receiving, at the radar device, an initial reflected electromagnetic signal corresponding to the initial electromagnetic signal;

converting the initial reflected electromagnetic signal into a set of base magnitude values corresponding to the set of bin values; and integrating, using a moving window, the base magnitude values over the successive subranges of bin values to determine the set of integrated base magnitude values; and determining the presence of cargo in the container, wherein determining the presence of cargo in the container comprises the steps of:

transmitting, by a radar device, a first electromagnetic signal within the container;

receiving, at the radar device, a first reflected electromagnetic signal corresponding to the first electromagnetic signal;

converting the first reflected electromagnetic signal into a set of first magnitude values corresponding to a set of bin values, each bin value representing a respective distance from the radar device;

integrating, using a moving window, the first magnitude values over successive subranges of bin values to produce a set of integrated magnitude values;

subtracting a set of integrated base magnitude values from the set of integrated magnitude values to produce a set of normalized integrated magnitude values; and comparing each of the normalized integrated magnitude values with corresponding threshold values.

16. The method of claim 15, further comprising:

detecting the presence of cargo within the container by:

identifying one of the integrated normalized magnitude values exceeding its corresponding threshold value;

identifying one of the subranges of bin values associated with the one of the integrated normalized magnitude values exceeding its corresponding threshold value; and determining a distance of the cargo from the radar device based on one or more of the respective distances represented by the bin values of the one of the subranges of bin values.

17. The method of claim 16, wherein determining a distance of the cargo from the radar device is based on a measure of central tendency of the bin values of one of the subranges of bin values.

18. The method of claim 15, further comprising:

detecting the absence of cargo within the container by determining that none of the integrated normalized magnitude values exceed the corresponding threshold values.

19. The method of claim 15, wherein each subrange includes an equal number of bin values, and wherein there is overlap between the bin values associated with a particular subrange and the bin values associated with an adjacent subrange.

20. The method of claim 19, wherein the overlap is equal to the number of bin values in each subrange minus one.

* * * * *